United States Patent [19]

Lobunez et al.

[11] Patent Number: 5,198,145

[45] Date of Patent: Mar. 30, 1993

[54] DRY DETERGENT COMPOSITIONS

[75] Inventors: Walter Lobunez, Princeton; David Goldstein, Brunswick, both of N.J.

[73] Assignee: FMC Corporation, Philadelphia, Pa.

[21] Appl. No.: 802,918

[22] Filed: Dec. 6, 1991

Related U.S. Application Data

[63] Continuation of Ser. No. 610,668, Nov. 8, 1990, abandoned.

[51] Int. Cl.$^5$ .............. C11D 11/00; C11D 3/10; C11D 7/12; C11D 17/06
[52] U.S. Cl. .................. 252/174.14; 252/91; 252/174.13; 252/184; 423/206 R; 423/421; 423/426; 423/419 R
[58] Field of Search .............. 252/91, 174.13, 174.14, 252/184; 423/242, 206 R, 244, 421, 426, 419 R

[56] References Cited

U.S. PATENT DOCUMENTS

| | | | |
|---|---|---|---|
| 1,877,368 | 9/1932 | Seyer | 423/421 |
| 3,235,329 | 2/1966 | Gancy | 423/425 |
| 3,764,541 | 10/1973 | Kaneko | 252/174.13 |
| 4,005,987 | 2/1977 | Jury | 23/313 FB |
| 4,018,868 | 4/1977 | Knight | 423/244 |
| 4,039,617 | 8/1977 | Kuo | 423/186 |
| 4,105,744 | 8/1978 | Erdoess et al. | 423/239 |
| 4,265,790 | 5/1981 | Winston | 252/135 X |
| 4,427,417 | 1/1984 | Porasik | 252/99 X |
| 4,481,172 | 11/1984 | Lowell | 423/242 |
| 4,588,569 | 5/1986 | Cyran | 423/244 |
| 4,680,134 | 7/1987 | Heile et al. | 252/99 X |

*Primary Examiner*—W. J. Shine
*Assistant Examiner*—Douglas J. McGinty
*Attorney, Agent, or Firm*—Robert D. Jackson; Frank Ianno

[57] ABSTRACT

Dry-blended detergent formulations are prepared by absorbing liquid surfactant on absorptive soda ash derived from the dehydration of sodium carbonate decahydrate.

18 Claims, No Drawings

DRY DETERGENT COMPOSITIONS

This application is a continuation of application Ser. No. 610,668, filed Nov. 8, 1990, abandoned This invention relates to dry-blended detergent compositions, particular to those produced by absorbing a liquid surfactant on soda ash.

The manufacture of dry-blended detergent compositions by absorbing liquid surfactant on soda ash is well known in the art. Stated briefly, the procedure involves mixing the surfactant with soda ash and with various additives such as builders, anticorrosives, colorants, perfumes, etc., to give a granular detergent product. As understood herein, dry-blended detergent compositions include those formed by agglomeration.

Soda ash of the type used in making dry-blended detergent formulations is typically a low density sodium carbonate, produced commercially by calcining sodium bicarbonate ($NaHCO_3$) or sodium sesquicarbonate ($NaHCO_3.Na_2CO_3.2H_2O$); calcining temperatures are from about 100° C. up to about 300° C. Generally speaking, soda ash derived from sodium bicarbonate exhibits somewhat higher detergent absorptivities than soda ash derived from sesquicarbonate. Soda ash made as above described owes its absorptive qualities to the presence of a porous structure, apparently created by expulsion of carbon dioxide from the bicarbonate during calcination; or a combination of carbon dioxide and water vapor in the case of the sesquicarbonate. Most methods of producing absorptive soda ash involve calcining sodium bicarbonate or sesquicarbonate or compositions containing them.

It has now been found that a form of soda ash derived from the dehydration of sodium carbonate decahydrate can exhibit even higher absorptivity for liquid surfactants than realized heretofore and the provision of dry-blended detergent formulations prepared with such soda ash constitutes the principal objects and purposes of the invention. Other objects and purposes will become apparent in the ensuing description.

The dry-blended detergent formulations of the invention are prepared in the known manner except that the dehydrated sodium carbonate decahydrate serves as the source of the soda ash component.

The soda ash used in producing the detergent compositions of the invention is a low density form of sodium carbonate. It is a known, chemical entity which is highly reactive in the solid state with acidic gases such as HCN or $SO_2$.

As above noted, the herein soda ash is obtained by the dehydration of sodium carbonate decahydrate. This can be effected in various ways including vacuum drying, solvent extraction and most commonly by heating. The latter method is employed in the practice of the invention.

In the dehydration of sodium carbonate decahydrate by thermal means, the temperature is held below about 32° C. to avoid sintering or melting of the salt and its subsequent breakdown and dissolution in the released water of crystallization. The water must be expelled from the solid decahydrate in order to give a porous, absorptive soda ash product.

The temperature limit aforesaid is only necessary during the initial phase of the dehydration. Once some of the water is evolved, the temperature can be gradually increased without causing dissolution of the hydrated salt. Apparently the presence of partially dehydrated material acts as a stabilizer against dissolution possibly by absorbing the released moisture.

Generally speaking, the dehydration is carried out over a temperature range of about 31° C. to about 150° C. The procedure is continued until a composition is reached corresponding to $Na_2CO_3.nH_2O$ where n is 0 to 1.

Various techniques have been developed for producing soda ash by heating sodium carbonate decahydrate to remove water of crystallization. For instance, in British Patent No. 398,732, a process is described in which sodium carbonate decahydrate is completely dehydrated by passing air at 32° C. to 33° C. through thin layers of the salt placed on grids until all of the bound water is removed so that no dissolving melting of the salt occurs during the process of dehydration.

Two-stage procedures for carrying out the dehydration have also been developed, an example of which is set forth in U.S. Pat. No. 4,039,617 to Kuo. In the first step of the Kuo process, crystals of sodium carbonate decahydrate are dried to the monohydrate at about 20° C. to 50° C. in a forced convection dryer, such as a fluid bed dryer. In the second step, the monohydrate crystals are further dried at about 100° C. to 200° C. to give a light soda ash. A similar two-stage procedure is disclosed in Swedish Patent Application No. 8801570-6; see also U.S. Pat. No. 2,125,377.

Although generally suitable for reacting with acid gases, the soda ash produced by the prior art processes may not necessarily exhibit satisfactory and/or consistent liquid surfactant absorptivity. This perhaps is not surprising considering the diverse nature of the two properties - a chemical change as opposed to a physical change.

Therefore, a great deal of time and effort was expended in an effort to develop a process for dehydrating sodium carbonate decahydrate which would reliably yield a soda ash product capable of higher surfactant absorptivity than obtainable heretofore. Of the various approaches that were tried, fluid bed dehydration proved especially advantageous and is the method of choice for realizing the objects and purposes of the invention. The technique is economical of operation, gives a highly absorptive soda ash product and affords good reproducibility.

In carrying out the fluid bed dehydration herein, the decahydrate crystals must not be allowed to melt or sinter as this results in the formation of dense, gritty particles of soda ash having poor absorptivity. So far as can be determined, optimum product absorptivity is achieved by operating the fluid bed at temperatures no higher than about 32° C. which is just below the fusion point of the decahydrate particles. The fluidizing medium can be any relatively inert gas such as air or nitrogen. Fluidizing velocities are in the range of 5 to 50 cm/sec, depending on particle size and distribution.

It can be seen from the data listed in Table I that the presence of water and sodium bicarbonate in the product had a negative effect on the surfactant absorptivity value. The effect of water presence can be seen from Examples 3 and 4. The product of Example 3 was formed from the decahydrate crystals collected from an alkali lake and containing only 0.7% of sodium bicarbonate. The product contained 13.4% of water, corresponding to 0.9 moles per mole of sodium carbonate, and 1.1% of sodium bicarbonate. The product surfactant absorptivity value was 100%. The product of Example 4 was obtained from the reagent sodium decahydrate and contained 32% of water, corresponding to 2.9 moles of water per mole of sodium carbonate. It had a surfactant absorptivity value of 29%. This suggests that the voids volume (that is, pores available for surfactant absorption) that is formed from dehydrating the decahydrate is not proportional to the product surfactant absorptivity, and that the surfactant absorptivity increases faster near the end of drying. The water molecules in the product particles are probably blocking some pores and rendering them inaccessible to the absorbate.

The effect of sodium bicarbonate can be seen from Examples 1 and 2. In Example 2, the original amount of sodium bicarbonate in the crystals obtained from the alkali lake liquor was 10.8%. After decreasing the total weight by evaporating water, it became 20%. The water content changed from about 56% to 17.8% with 1.7 moles of water per mole of carbonate. The product surfactant absorptivity was 56%. In Example 1, the fluidizing air contained about 10% of $CO_2$, and a part of the sodium carbonate that was present in the crystals was converted to sodium bicarbonate (32.7% in the product). The amount of water changed from 56% to 16.2%. The product surfactant absorptivity was 31%. It appears that the sodium bicarbonate formation also can obstruct some pores formed from dehydrating the decahydrate and cause a larger relative decrease in the surfactant absorptivity value than a calculated decrease in the voids volume.

The fluidizing bed dehydration of the sodium carbonate decahydrate can be accelerated by partial dehydration of the decahydrate below 32° C. and then feeding the predried material into a fluid bed for continuation of the dehydration at higher temperatures. As previously noted, the presence of partially dehydrated material apparently acts as a stabilizer against fusion of the hydrated salt, possibly by absorbing the released moisture to form higher melting hydrate salts.

Utilizing this procedure, decahydrate crystals formed by evaporating alkali lake liquor at ambient temperature conditions, were introduced into a fluid bed operated at a temperature range of about 55° C. to 82° C. Five separate examples were carried out, the results of which are presented in Table II.

As will be observed, more absorptive products were formed when the low temperature drying resulted in intermediate products containing smaller amounts of water. For instance, in Example 5, the decahydrate was dried under room temperature conditions until it contained about 8 moles of water per mole of sodium carbonate. The final product obtained from drying the intermediate product at 55° C. to 82° C. down to 0.2 moles of water had a surfactant absorptivity value of only 26%. The product of Example 6 was obtained by drying the decahydrate under room temperature conditions to 1.2 moles of water per mole of sodium carbonate and then drying this intermediate product at 55° C. to 68° C. to 0.4 moles of water per mole of sodium carbonate. The final product had a surfactant absorptivity value of 81%. Based on the data from Table II, the effect of water content in the intermediate product on the product surfactant absorptivity obtained after drying under elevated temperature conditions is readily apparent.

With the same starting material, some sodium bicarbonate (10.2%) was left undecomposed in the final product of Example 7. This product had the same surfactant absorptivity value as the product from Example 8, although a greater surfactant absorptivity could be expected since the intermediate product in this case contained only 3 moles of water in comparison to 4 moles in Example 8 per mole of sodium carbonate.

A modification of the fluidized bed dehydration of sodium carbonate has been found which eliminates the need for a low temperature step while still providing a final soda ash product of high surfactant absorptivity. In this amended procedure, dehydration is effected by heating a homogeneous mixture of sodium carbonate decahydrate and sodium carbonate (from previously dehydrated decahydrate) in a fluidized bed.

The drying temperatures can range from ambient to about 300°0 C., preferably about 100° C. to about 300° C. and more preferably about 100° C. to about 250° C.

As to the drying time, this is not especially critical and typically ranges from a few seconds or minutes up to an hour or so. Optimum drying time ordinarily is dependent on the type of apparatus and the drying temperatures. Sufficient predried product should be employed in the sodium carbonate decahydrate crystalline feed to maintain the mole ratio of water (hydrated or free) to sodium carbonate equivalent (both decahydrate and recycled soda ash) at no higher than about five moles water per mole of sodium carbonate. This proportion of ingredients is preferably adjusted so as to maintain the mole ratio at a value between one to five moles water per mole of sodium carbonate.

The proportion of predried sodium carbonate decahydrate product to sodium carbonate decahydrate crystals may alternatively be expressed on a weight basis, the preferred ratio being within the range of 0.35:1 to 4:1, more preferably from 0.35:1 to 1:1, and most preferably, 0.35:1 to 0.5:1.

The predried soda ash product is desirably introduced along with the sodium carbonate decahydrate as separate feed streams into the drying zone, where intimate mixing of the two streams is accomplished. An alternative to the preferred procedure is the intimate mixing of the soda ash product with the sodium carbonate decahydrate prior to their introduction to the drying zone.

Mixing predried soda ash with sodium carbonate decahydrate within the ranges specified for this invention achieves two objectives. First, a final soda ash product having both high absorptive capacity and low bulk density is prepared. Secondly, many of the problems normally associated with the drying of sodium carbonate decahydrate are avoided. For instance, the process minimizes formation of unmanageable chunks of partially dehydrated soda ash and scaling of the equipment due to melting of the decahydrate crystals as the water of hydration is removed during drying.

Reference is now made to the following illustrative, nonlimiting examples and procedures.

EXAMPLE A

Absorptive Soda Ash by Two-stage Dehydration of Sodium Carbonate Decahydrate

Apparatus

A laboratory size fluidized bed reactor was constructed from a piece of glass tubing, 47 mm I.D. and 270 mm long which was topped with an inverted 6 liter Erlenmeyer flask the bottom of which had been removed. The bottom of the reactor was fitted with a coarse glass frit. Solid feed was admitted to the reactor through the top and product withdrawn by way of a side tube situated near the bottom. Fluidizing air was introduced through the bottom of the reactor. A glass-col heating tape was used to heat the reactor.

Procedure

Sodium carbonate decahydrate crystals, such as obtained from the alkali lake of a trona plant, were dehydrated at ambient temperature (below 32° C.) to obtain intermediate products containing $Na_2CO_3 \cdot nH_2O$ where n can be 1 to 8.

In a second step, the intermediate products from the first step were further dehydrated in a fluidized bed at 55° C. to 82° C. to give a sodium carbonate containing 0.1 to 0.6 moles of water per mole of $Na_2CO_3$.

It was found that sodium carbonate having acceptable surfactant absorptivities was obtained when the average water content of the fluid bed dried feed was maintained below the equivalent of about 5 moles water per mole of $Na_2CO_3$.

EXAMPLE B

Absorptive Soda Ash by Dehydration of Sodium Carbonate Decahydrate in the Presence of Predried Decahydrate Using the glass tube fluidized bed dryer of Example A, the device was first charged with sodium carbonate crystals (12 g) that had been prepared from sodium carbonate decahydrate crystals obtained from an alkaline pond in Green River, Wyo. The crude sodium carbonate decahydrate crystals had been dried at ambient temperature in a fluidized dryer.

Fluidization of this starting charge was begun, with the superficial air velocity averaging about 35 cm/sec, and the temperature raised to 176° C. At this point, gradual introduction of the feed material was begun, and continued until all of the feed material had been added, over a period of approximately 50 minutes.

The feed material consisted of damp crystals of hydrated sodium carbonate, predominately decahydrate (16.2 g), mixed with soda ash product (10 g) from a previous drying run, as recycled product. The damp hydrated sodium carbonate crystals had been obtained from the bottom of the alkali pond, and had been water-washed and wet crushed to yield particles less than 20 mesh in size. The surfactant absorptivity of the recycled soda ash product was 50%.

The weight ratio of recycled soda ash product to decahydrate feed crystals was 0.61:1. The mole ratio of free and hydrated water in the decahydrate feed crystals to sodium carbonate equivalent in the feed and recycled soda ash product together was approximately 3.9 moles $H_2O$:1 mole $Na_2CO_3$.

During the addition of the feed material, the temperature of the fluidized bed was maintained at about 205° C., ±10° C. The drying was terminated shortly after all feed material had been added and the bed allowed to cool while being fluidized with ambient air. The soda ash product (21 g) was then recovered. Its surfactant absorptivity was measured as being 81%.

Surfactant Absorptivity

The absorptivity of the resultant soda ash product was determined by measuring the ability of the product to absorb a nonionic surfactant. Into a 50 ml polypropylene centrifuge tube were first placed 10 g light density sodium tripolyphosphate (STPP) to act as a wicking agent for excess surfactant. Two discs of glass filter cloth were then placed on a perforated plastic disc that was placed on top of the STPP in the tube; a fine wire attached to the disc permitted placement and removal of the disc.

The sample of soda ash to be evaluated (generally 10 g) was placed on top of the filter disc. Triton ® X-100 nonionic surfactant (marketed by Rohm and Haas Company, Philadelphia, Pa.) was then added dropwise and mixed with the sample until it was evident visually that an excess of surfactant was present. The sample tube was centrifuged at 2250 RPM for 25 minutes in a Precision Universal Laboratory Centrifuge Model No. 67310 (Precision Scientific Group of GCA Corporation, Chicago, Ill.). The soda ash sample was then removed and weighed, the absorptivity being the percent increase in weight over the starting weight.

TABLE I

Dehydration of Sodium Carbonate Decahydrate in Fluidized Bed Reactor Below 32° C.; Fluidizing Medium, Air

| Examples | Moles of Water Per Mole of Sodium Carbonate in Dehydrated Product | Sodium Bicarbonate (w/%) in Dehydrated Product | Surfactant Absorptivity (w/%) of Dehydrated Product |
|---|---|---|---|
| 1[1] | 1.9 | 32.7 | 31 |
| 2[b] | 1.7 | 20.0 | 56 |
| 3[c] | 0.9 | 1.1 | 100 |
| 4[d] | 2.9 | 0.0 | 29 |
| Commercial Soda Ash From: | | | |
| Bicarbonate Process | | | 55 |
| Sesqui Process | | | 29 |

[a]Starting decahydrate prepared from alkali lake liquor; 10% $CO_2$ in fluidizing air.
[b]Starting decahydrate prepared from alkali lake liquor.
[c]Starting decahydrate consisted of alkali lake crystals.
[d]Starting decahydrate reagent grade sodium carbonate decahydrate.

TABLE II

TWO-STAGE DRYING
Absorptivity of sodium carbonate made by dehydrating impure decahydrate at a temperature below 32° C. and then at 55° C. to 82° C. in a fluidized-bed reactor.

| Examples | Moles of Water Per Mole of Sodium Carbonate in Intermediate Product | Moles of Water in Final Product | Sodium Bicarbonate % in Final Product | Final Product Absorptivity % |
|---|---|---|---|---|
| 5 | About 8 | 0.2 | 1.8 | 26 |

TABLE II-continued

TWO-STAGE DRYING
Absorptivity of sodium carbonate made by dehydrating impure decahydrate at a temperature below 32° C. and then at 55° C. to 82° C. in a fluidized-bed reactor.

| Examples | Moles of Water Per Mole of Sodium Carbonate in Intermediate Product | Moles of Water in Final Product | Sodium Bicarbonate % in Final Product | Final Product Absorptivity % |
|---|---|---|---|---|
| 6 | 1.2 | 0.4 | 0.0 | 81 |
| 7 | 3.0 | 0.3 | 10.2 | 68 |
| 8 | 4.0 | 0.1 | 0.0 | 68 |
| 9 | 6–7 | 0.6 | 0.2 | 39 |

We claim:

1. In the process of making dry-blended detergent formulations of the type in which liquid surfactant is absorbed on absorptive soda ash, the improvement wherein the soda has employed has elevated surfactant absorptivity and is produced by dehydrating sodium carbonate decahydrate crystals recovered from alkali liquors at a temperature below their melting point to give a partially dehydrted product containing the equivalent of from about 1 to 5 moles of bound water, and which is free of amounts of sodium bicarboante that inhibit said elevated surfactant absorptivity, and optionally in a second stage heating the so-obtained partially dehydrated product until the equivalent bound water content thereof is from about 0 to 1 moles.

2. The process of claim 1 wherein the product of the first stage dehydration has a water content equivalent to sodium carbonate monohydrate, $Na_2CO_3 \cdot H_2O$.

3. The process of claim 1 wherein the liquid surfactant is a nonionic surfactant.

4. The process of claim 1 wherein the second-stage heating is carried out in a fluid bed.

5. The detergent formulation produced in accordance with the process of claim 1.

6. The detergent formulation produced in accordance with the process of claim 2.

7. The detergent formulation produced in accordance with the process of claim 3.

8. The detergent formulation produced in accordance with the process of claim 4.

9. In the method of making dry-blended detergent formulations of the type in which a liquid surfactant is absorbed on absorptive soda ash, the improvement wherein the absorptive soda ash is produced by dehydration of sodium carbonate decahydrate, said dehydration being carried out by heating in a relatively inert fluidizing medium a fluidized mixture of the sodium carbonate decahydrate and previously dehydrated sodium carbonate decahydrate, the quantity of the previously dried sodium carbonate decahydrate to undried sodium carbonate decahydrate being in weight ratio of from about 0.35:1 to about 4:1 to prevent melting of the sodium carbonate decahydrate as it undergoes dehydration.

10. The method of claim 9 wherein the temperatures are from about 100° C. to about 300° C.

11. The method of claim 10 wherein the temperatures are from about 100° C. to about 250° C.

12. The method of claim 9 wherein the ratio is from about 0.35:1 to about 1:1.

13. The method of claim 12 wherein the ratio is from about 0.35:1 to about 0.5:1.

14. The detergent formulation produced in accordance with the method of claim 9.

15. The detergent formulation produced in accordance with the method of claim 10.

16. The detergent formulation produced in accordance with the method of claim 11.

17. The detergent formulation produced in accordance with the method of claim 12.

18. The detergent formulation produced in accordance with the method of claim 13.

* * * * *